United States Patent
Marvit et al.

[11] Patent Number: 5,457,689
[45] Date of Patent: Oct. 10, 1995

[54] HIGH SPEED POLLING PROTOCOL FOR MULTIPLE NODE NETWORK WITH SEQUENTIAL FLOODING OF A POLLING MESSAGE AND A POLL-ANSWERING MESSAGE

[75] Inventors: Maclen Marvit, Pasadena; Harold Kirkham, Sunland, both of Calif.

[73] Assignee: California Institute of Technology, Pasadena, Calif.

[21] Appl. No.: 106,446

[22] Filed: Aug. 16, 1993

Related U.S. Application Data

[63] Continuation-in-part of Ser. No. 683,269, Apr. 10, 1991, Pat. No. 5,341,372.

[51] Int. Cl.[6] .................................................. H04L 12/28
[52] U.S. Cl. .......................... 370/85.8; 370/16; 370/92; 370/94.3; 361/601; 340/825.52; 340/825.54; 340/825.08
[58] Field of Search ............... 370/564, 60, 60.1, 370/85.8, 85.13, 85.14, 92, 94.1, 94.2, 94.3, 95.2, 97, 16; 340/825.07, 825.08, 825.52, 825.54, 310 R, 310 A; 361/67, 68, 332; 371/8.1, 11.1

[56] References Cited

U.S. PATENT DOCUMENTS

| | | | |
|---|---|---|---|
| 4,419,666 | 12/1983 | Gurr et al. | 340/825.08 |
| 4,995,035 | 2/1991 | Cole et al. | 370/95.2 |
| 5,007,052 | 4/1991 | Flammer | 370/94.3 |
| 5,038,140 | 8/1991 | Ikeuchi | 370/95.2 |
| 5,128,789 | 7/1992 | Abramovitz | 370/94.3 |

*Primary Examiner*—Hassan Kizou
*Attorney, Agent, or Firm*—Robert M. Wallace

[57] ABSTRACT

The invention is a multiple interconnected network of intelligent message-repeating remote nodes which employs a remote node polling process performed by a master node by transmitting a polling message generically addressed to all remote nodes associated with the master node. Each remote node responds upon receipt of the generically addressed polling message by sequentially flooding the network with a poll-answering informational message and with the polling message.

16 Claims, 6 Drawing Sheets

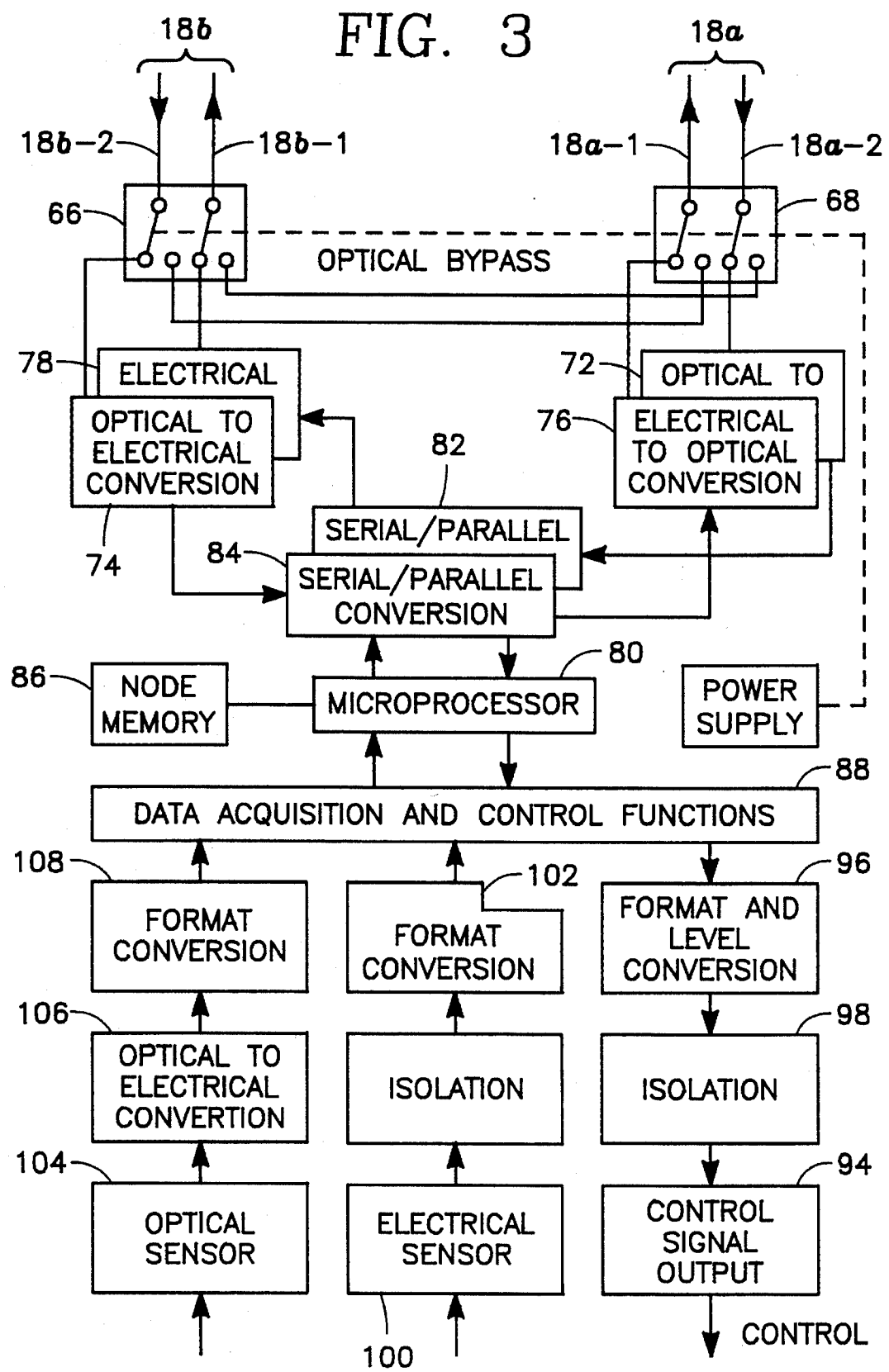

HIGH SPEED POLLING PROTOCOL FOR MULTIPLE NODE NETWORK WITH SEQUENTIAL FLOODING OF A POLLING MESSAGE AND A POLL-ANSWERING MESSAGE

ORIGIN OF THE INVENTION

The invention described herein was made in the performance of work under a NASA contract, and is subject to the provisions of Public Law 96-517 (35 USC 202) in which the Contractor has elected to retain title.

CROSS-REFERENCE TO RELATED APPLICATIONS

This application is a continuation in part of U.S. patent application Ser. No. 07/683,269 filed Apr. 10, 1991, now U.S. Pat. No. 5,341,372, and assigned to the assignee of the present application (hereinafter referred to as the "parent application"), the disclosure of which is incorporated herein by reference. The present application claims an embodiment of the invention described in co-pending U.S. patent application Ser. No. 08/029,620 filed Mar. 11, 1993 by Harold Kirkham entitled "High Speed Polling Protocol for a Multiple Node Network" and assigned to the assignee of the present application (hereinafter referred to as the "co-pending application").

BACKGROUND OF THE INVENTION

1. Technical Field

The invention is a communication network of interconnected zones of intelligent nodes which employs a high speed polling process performed by nodes which are master nodes governing respective ones of the zones.

2. Background Art

Referring now to FIG. 1B, the parent application identified above describes a communication network of nodes 16, each of the nodes including a node processor for relaying messages between others of the nodes. A plurality of links 18 connect the nodes in multiple rings 22 of nodes, the network being divided into plural zones wherein each node responds only to a master node 14 in the local zone. Those nodes located at boundaries between adjacent zones are gateway nodes 20 and respond to master nodes of the adjacent zones, each of the gateway nodes being connected to nodes in adjacent zones of the network. Each node processor performs a distributed protocol for terminating a message if the message or a reply to the message from another node has been previously received or seen at the node. The node processors of the master nodes perform polling by transmitting a message authorizing a particular one of the other nodes in the local zone to transmit a new message, while the node processors in other nodes transmit a new message only upon receipt of the polling message from the local master node authorizing the particular node to transmit a new message. The polling feature permits all control of communication in the network to be concentrated in the master nodes.

One feature which maximizes the reliability of such a communication network is that the transmitting and relaying of messages (including polling messages) by each node in the network is performed in accordance with a flooding method in which each node broadcasts the message it is transmitting or relaying to all adjacent nodes. As a result, a message transmitted on the network will be broadcast eventually to all nodes, but, because of the "anti-body" algorithm performed by each node (in which the node kills any message it has previously transmitted), the message is seen by each node only once. The method of the invention "floods" the network with the message and chooses the shortest path between the transmitting and receiving nodes because it chooses all paths. Reliability of such a network is maximum because the loss of a single link (or even several links in most cases) cannot prevent the message from eventually reaching its destination, because the message travels on all links.

The entire network is monitored by each master node periodically polling all nodes within its zone. In doing so, the master node transmits a polling message addressed to a certain node, to which only the addressed node responds with an answering message. Once it receives the answering message, the master node repeats the process for the next node until all nodes in the zone have been polled. Thus, the master node transmits a succession of polling messages to successive nodes and receives successive responses. In the parent application, both the polling message and the answering message are flooded throughout the entire zone of the network.

While the foregoing provides an orderly and highly reliable polling system, it consumes a great deal of time in polling all nodes, which slows down the routine process of data aquisition. This is because each polling message must be relayed through intervening nodes to the message's destination node, that node's response must be relayed back and then the foregoing process must be repeated with the next node to be polled. Thus, the polling time for a network increases rapidly as a function of the number of nodes, a significant disadvantage. For example, in a simple version of the type of network described in the parent application comprising (in this example) a ring of ten nodes, one of which is a master node, polling of all nodes by the master node would require a total of 50 successive message transmissions ("hops") between adjacent nodes. Nevertheless, it has seemed that the disadvantage of the time required to poll the network was justified by the inherent reliability.

Accordingly, it is an object of the invention to reduce the amount of time required to poll all nodes without concomitantly reducing the reliability of the network.

The invention described in the above-referenced co-pending application is an improvement in the type of network disclosed in the parent application which greatly reduces the number of "hops" required to poll all nodes without significantly reducing the reliability of such a network. Specifically, the succession of polling messages addressed to different individual nodes is replaced by a single polling message not addressed to any particular node (or, equivalently, addressed to all nodes), so that it elicits a response from each node it encounters. The first node to receive the polling message transmits an answering message in the return direction (i.e., down the link that the polling message arrived from), but not in any other direction. Simultaneously, the first node broadcasts the polling message in all other directions (i.e., down all other links to which it is connected, except the link down which it transmits the answering message). Next, a second node (i.e., the node closest to the first node) receives the polling message relayed by the first node, and the second node follows the same procedure previously performed by the first node. Specifically, the second node transmits an answering message to the first node (i.e., down the return direction from which the relayed polling message arrived at the second node), while simultaneously the second node repeats or broadcasts the polling message in all other directions.

In the co-pending application, all nodes are programmed to broadcast any message other than a polling message in all directions, so that poll-answering messages from remote nodes flood the network. Thus, in the foregoing example, the second node's answering message is broadcast by the first node on all links to which the first node is connected.

In the co-pending application, each remote node may be programmed to sense whether a received message not addressed to it is the answering message of another remote node responsive to a polling message. If so, the relaying node transmits the other node's answering message down the same direction it previously transmitted its own answering message responsive when it responded to the polling message.

The advantage is that the remote nodes transmit their answering messages to the master node as fast as the polling message travels from node to node throughout the network. In contrast, the network of the parent application had a delay between successive poll-answering messages received at the master node corresponding to the transit time of the next polling message to the next node to be polled and the transit time of the next node's poll-answering message back to the master node. It will be recalled that in the simple examplary network discussed previously with reference to the parent application, a total of 50 "hops" were required to poll all nodes. In the invention of the co-pending application, the same network layout would require only 10 hops to poll all nodes, a factor of 5 improvement in speed where the number of nodes is 10. A greater improvement factor is achieved in larger networks.

The reliability is not reduced comcomitantly (e.g., by a factor of 5) however. Since the polling message floods the network, the polling process of the present invention is susceptible to failure only if the link in the return direction is broken sometime during the very short time interval after it has received the polling message from the upstream node and before the response is received back at the upstream node. Thereafter, the messages are flooded in the manner described in the above-referenced parent application. The time interval referred to above is so short that the probability of such a failure is negligible. Thus, a negligible decrease in reliability is incurred for a very large increase in polling speed.

SUMMARY OF THE INVENTION

In the present invention, the node responds to a received polling message by broadcasting its answering message in all directions (i.e., down all links to which the node is connected). It also relays the poll message in the same manner by broadcasting it in all directions, so that the poll message floods the network. Rather than transmitting the answering message simultaneously with relaying the polling message, the node must do this sequentially (in either order). For example, the node may first broadcast its poll-answering message and then, after a very short delay time (so that this message can be received completely), broadcasts (relays) the polling message.

BRIEF DESCRIPTION OF THE DRAWINGS

Preferred embodiments of the invention are described below in detail with reference to the accompanying drawings, of which:

FIG. 3 is a block diagram of a typical node of the network of FIGS. 1a–1b

DETAILED DESCRIPTION OF THE INVENTION

TABLE I

| | POLLING MESSAGE | | | POLL-ANSWERING MESSAGE | | | |
|---|---|---|---|---|---|---|---|
| | ADDRESSED TO | | | DIRECTION | | | |
| | | TARGET | RELAY BY | | DIRN | | |
| | ALL | NODE | | ONWARD | OF | | TIMING |
| | NODE | ONLY | FLOOD | ONLY | FLOOD | POLL | SIM | SEQU |
| PARENT APPLICATION | | * | * | | * | | | N/A |
| CO-PENDING APPLICATION | * | | | * | | * | * | |
| PRESENT INVENTION | * | | * | | * | | | * |

Distributed Protocol of the Parent Application:

The network protocols of the parent application were developed to meet the requirements of communicating in the electric distribution system. Maximum reliability was ensured by the use of network flooding, in which every communication node repeated every message not intended for it. Messages previously repeated by a node were removed (i.e., not repeated again) by that node. Access to the network was controlled centrally by a polling mechanism.

No node was allowed to transmit (except as a repeater), unless it was polled by the master station with a polling message bearing the node's address. While this leads to a controlled and orderly system, it slows down the routine process of data acquisition. While the channel capacity of the system of the parent application is 10 Mb/sec, the effective speed is much slower. The programming of each node in the foregoing system of the parent application is summarized in the first row of the table of Table 1.

High Speed Polling Process of the Co-Pending Application:

The effective speed is significantly increased in the high speed polling protocol of the co-pending application by programming the microprocessor of each node in accordance with the second row of the table of Table 1. Before discussing the table of table 1 in detail, however, the physical structure of a network employed in carrying out the present invention will first be described with reference to FIG. 1a.

Figure 1A:
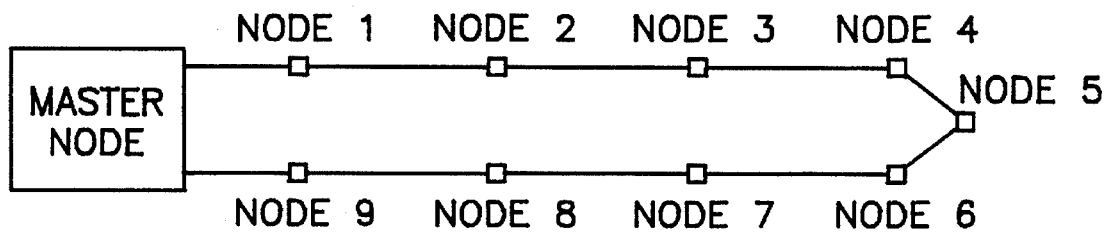
FIG. 1a is a block diagram of a simple network embodying the invention.

Consider the ring of remote units labelled nodes 1 through 9 and their master node in the network of FIG. 1a. In the polling method of the parent application, the master node would send a poll (request for data) to node 1 first. The poll has to travel the length of one fiber (i.e., the optical fiber between the master node and node 1) to reach its destination. This may be thought of as one "hop". Node 1 responds immediately by transmitting a poll-answering message, which reaches the master node after a second "hop" in the opposite direction over the same cable. Therefore, after two "hops" the master has received the requested data, and polls node 2. This second poll specifies the address of node 2 and therefore is relayed (rather than answered) by node 1 and reaches its destination after a total of two hops. The poll-answering message from node 2 arrives at the master after a further two hops. Altogether, fifty hops are required for the master node to collect the data from the 9 remote nodes (nodes 1–9) of FIG. 1a.

In accordance with the high speed polling protocol of the co-pending application, the polling message is a broadcast message specifying a generic destination address (or no address at all) to which each of the nodes 1–9 responds upon receipt. The first node to receive the polling message responds with data in the return direction and simultaneously repeats the polling message in the onward (all other) directions. In the case of the ring of nodes 1 through 9 in FIG. 1a, the master node transmits the polling message at both of its ports simultaneously. Nodes 1 and 9 will receive the message first and respond simultaneously so that their poll-answering messages will arrive simultaneously at the two ports of the master node to which they are connected. This means that the master node must be programmed to separately buffer messages arriving simultaneously at its two ports. The same analysis applies at any node located where the network branches.

At the end of two hops, then, the master has received the data from the closest two nodes (nodes 1 and 9), and the next two closest nodes (nodes 2 and 8) receive the polling message. After ten hops, the data from all nodes have been received at the master. This represents a performance improvement of a factor of 5 in speed. Acquiring data in the co-pending application from all nodes takes no more time than acquiring data from the most distant node alone, a significant advantage.

There are no message collisions and no unpredictable delays. In a more compicated topolgy, these advantages are retained. There may be the need sometimes to buffer the data, but this does not represent a significant drawback. The approach works because, at any general node, the polling message is bound to arrive first by the shortest path, and any node along this path that is closer to the master has already seen the polling message, responded and is idle.

There is a very small decrease in reliability compared to the original protocols. If the network is damaged along the fiber to a responding node in the short time between the receipt of the poll and the receipt of the response, the response will not arrive at the master. In the parent application, a copy of the response would be flooding out along all other fibers, and while the response might take longer to return than the polling message was in transit, it would have arrived if any duplicate path existed. In the present invention, only the shortest path carries the response on its first hop (which is why the method has slightly increased vulnerability to failure). All other fibers are carrying the polling message. This is a trade-off that would be acceptable in most applications. The method of the present invention uses flooding for propagating all messages throughout the network after this first hop, and (as in the description of the above-referenced parent application) does not require any node to know the configuration of the network.

In accordance with a further feature of the invention, there is an advantage in having each node remember the direction from which it received its polling message, and to use this direction to pass other responses back to the master node, as well. This amounts to a supplementary means of limiting messages in the network (in addition to the distributed protocol or antibody algorithm).

Each of the foregoing features of the invention is readily implemented by the skilled worker in view of the foregoing teachings by programming appropriate changes in the software instructions stored in the microprocessor memories of each node and of the master node.

Programming the Node Microprocessor in Accordance With Each of the Embodiments of the High Speed Polling Protocol of the Co-Pending Application:

As described above, the microprocessor of each remote node is programmed with instructions which implement one of three embodiments of the high speed polling protocol of the co-pending application. As mentioned previously, the table of Table 1 summarizes the variables that must be programmed (across the top of the table), and the three embodiments described in the co-pending application (down the left-most column), the third embodiment being the subject matter of the present application. The first row (labelled "PARENT APPLICATION") corresponds to the network of the parent application, and is provided for the sake of comparison. The second row (labelled "CO-PENDING APPLICATION") corresponds to the invention of the co-pending application. The third row (labelled "PRESENT INVENTION") corresponds to the invention of the present application.

The variables that must be programmed to realize the high speed polling protocol include (reading from left to right across the top of the table of table 1): what nodes the polling message is addressed to, how the polling message is relayed from node to node, the direction in which the node transmits its poll-answering message, the timing of relaying the polling message relative to the transmission of the poll-answering response, and how poll-answering responses from other nodes are relayed.

In the parent application, these variables are programmed as follows in accordance with the first row of the table of table 1: the polling message is addressed to a particular target node, and is relayed by flooding throughout the network; the poll-answering message is broadcast on all ports of the node so as to permit it to flood the network; and, the poll-answering messages from other remote nodes are relayed by broadcasting them on all ports of the node so that such messages flood the network.

In the co-pending application, these variables are programmed in accordance with the second row of the table of table 1 as follows: the polling message is addressed generically to all nodes controlled by the master node 14 and is relayed by each node on all ports other than the port on which the polling message was received; the poll-answering message is transmitted by the responding node on the port from which the polling message was received, and the timing is such that the transmitting of the poll-answering message and the relaying of the polling message is simultaneous (or nearly so); and, poll-answering messages received from other nodes are relayed by broadcast on all ports so as to flood the network with such messages.

Programming the Node Microprocessor in Accordance the Present Invention:

In the invention of the present application, these variables are programmed in accordance with the third row of the table of table 1 as follows: the polling message is generically addressed to all remote nodes as in the previous embodiments, but is relayed by transmitting it on all ports of the node so that it floods the network; the poll-answering message is transmitted on all ports of the node so that it too floods the network, while its timing is sequential with respect to (i.e., before or after) the relay broadcast of the polling message; and, poll-answering messages received from other remote nodes are broadcast on all ports of the receiving node so that such messages flood the network.

Figure 1B:
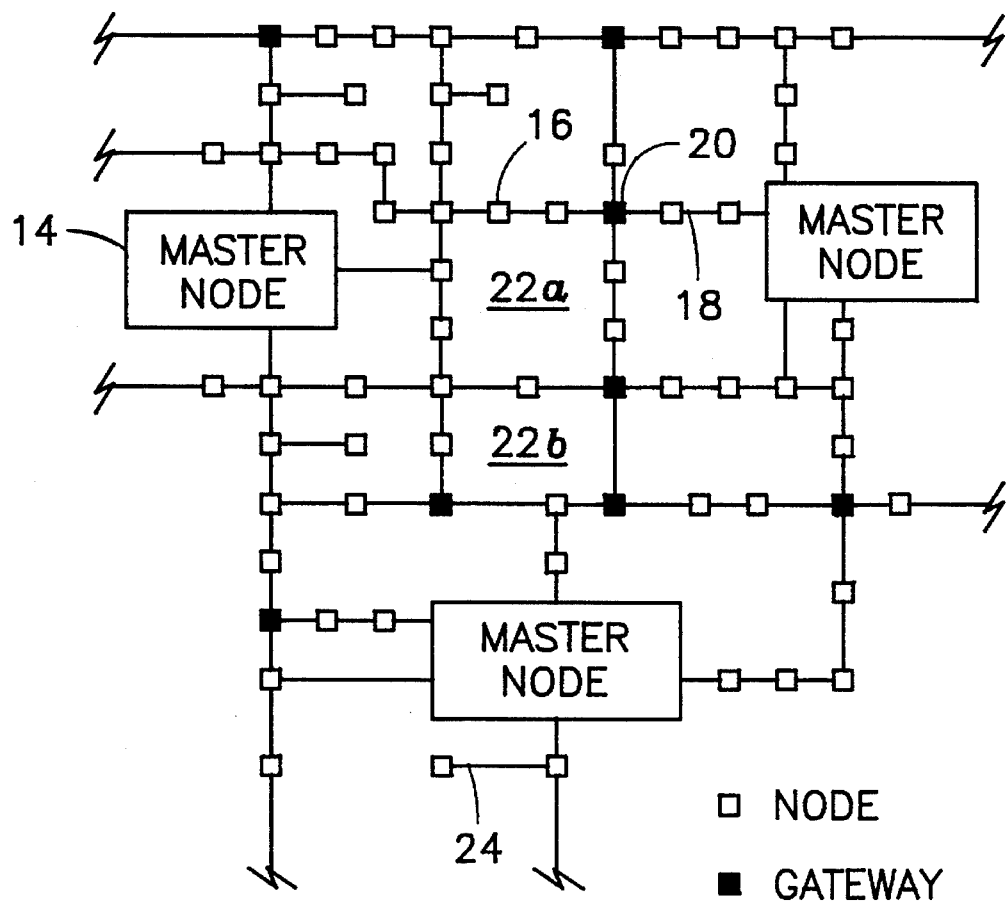
FIG. 1b is a block diagram of one preferred embodiment of the network of the invention.

Preferred Network In Which the Present Invention is Employed:

In the multiple interconnected ring network of FIG. 1b, any node 16 or master node 14 can transmit a message in the network. In order to effect the distributed protocol strategy, every message contains a unique identifying number that can be stored in every node 16 that it passes through. Since the operation of the nodes 16 in the separate rings 22 is assumed to be independent, the information required to identify a message uniquely can be based on the source address of the originating node and the time the message was originated, in one embodiment of the invention. This address may either be a logical address or the "street" address of the originating node. Each node 16 has a memory stack in which the identifying numbers of all passing messages are stored for future reference.

At all nodes, any received message (except a generically addressed polling message in certain embodiments of the present invention) is retransmitted on all outgoing lines, unless the message has been seen before, or is addressed to the node in question. Another approach would inhibit the retransmission of a message if the reply to it has already been seen at the node. By adopting such a strategy, a message inserted anywhere into the multiple interconnected ring network of FIG. 1b will be broadcast to all nodes 16. Furthermore, the message will not be repeated by a given node more than once. All links between nodes carry the message exactly once. The process is therefore as economical in operation as a single ring with an active monitor node. It is in some ways more efficient than a method which relies on some central unit working out a route for messages to go from node to node. The method of the invention "floods" the network with the message and chooses the shortest path between the transmitting and receiving locations because it chooses all paths. Transmission delay is therefore minimized. In flooding the network with the message, many copies of the message circulate simultaneously in different ones of the multiple interconnected rings of the network of FIG. 1b, and this process propagates throughout the network until every link has passed the message once. As a result of such "flooding", several copies of each message will be received at the destination node.

Because fiber optics are used in the preferred embodiment, communication reliability is so high that error correction is unnecessary. Should a message be corrupted before reaching its destination by one particular path, another "good" copy will arrive over a different path in most cases. Since the several copies of the received message will travel along different paths, interruption of a given path will not prevent arrival of at least one copy of the message. Therefore, reliability is maximized. The network will function even when fibers are broken disconnecting some nodes from one or more their neighbors.

The distributed protocol process of the invention resembles the working of the human body's immune system. The first time a T-cell in the immune system is exposed to an invading organism, it learns to recognize the organism as "non-self". On a second exposure, the T-cell stimulates production of antibodies that kill the invader. In the present invention, the messages are analogous to the invader, and they wander throughout the network of FIG. 1b as far as available communication channels will allow. On first exposure to a message, each node 16 extracts and stores information that will allow it, on a second exposure, to kill the message.

Figure 2A:
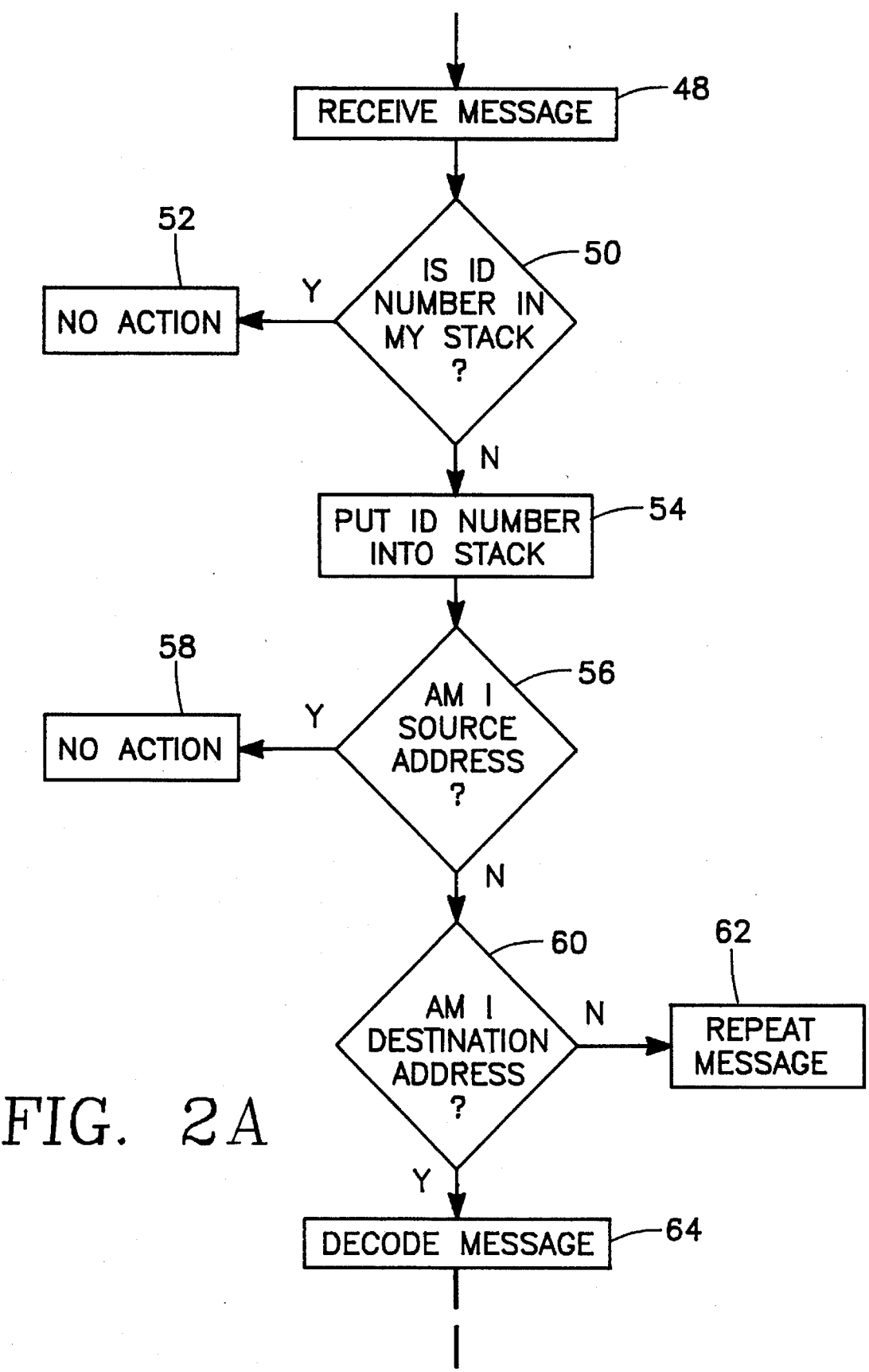
FIG. 2a is a flow diagram illustrating a distributed protocol process of the parent application.

Distributed Protocol Process of the Parent Application:

The distributed protocol process of the parent application performed by each node 16 in the multiple interconnected ring network of FIG. 1b is illustrated in FIG. 2a. It begins as a message is received by a particular one of the nodes 16 (block 48 of FIG. 2a). The node 16 first determines the unique identification number of the received message and determines whether that same number (or a greater number corresponding to the response to the message) was previously stored in the node's memory (block 50 of FIG. 2a). If the node finds the same identification number (or the greater number corresponding to the response to the message) stored in its memory (YES branch of block 50), then the node "kills" the message by not retransmitting it to other nodes and taking no other action with respect to the message (block 52 of FIG. 2a). Otherwise (NO branch of block 50), the node copies and stores the message's identification number in a memory stack (block 54 of FIG. 2a).

In the remaining steps of the process of FIG. 2a, it is assumed that the message includes data bits identifying the location of the message origin as well as its destination in the network of FIG. 1b. The node determines whether it is the node which previously originated the received message (block 56 of FIG. 2a). If so (YES branch of block 56), the node "kills" the message by taking no further action (block 58 of FIG. 3a). Otherwise (NO branch of block 56), the node next determines whether it is the destination of the message (block 60 of FIG. 2a). If the message does not bear the destination address of the present node (NO branch of block 60), the node repeats the message to the other nodes in the network (block 62 of FIG. 2a). Otherwise (YES branch of block 52), the node decodes the message and responds accordingly (block 64 of FIG. 2a). For example, if the message is a diagnostic message, the node performs the tasks required in the message. It should be noted that the steps of blocks 56 and 58 may be unnecessary in some embodiments of the invention where, for example, the network topology is such that the originating node will never receive copies of the messages it originates.

Polling Protocol of the Parent Application:

The distributed protocol control process of FIG. 2a permits the use of centralized polling. By programming each node 16 to transmit new data only when it receives a specific request to do so from its local master node 14, the master node 14 can sequentially poll all of its local nodes without having to be connected directly to them. This solves the problem of several nodes independently deciding to transmit different messages which reach the master node 14 or some other point in the network simultaneously. Such polling is not cumbersome in the network of FIG. 1b because scanning all of the nodes should occupy only a few tens of milliseconds. If the message from one node is 1000 bits long and if there are 100 nodes, a complete scan comprises $10^5$ bits. Using optical fiber links, the anticipated data rate in the network of FIG. 1b is $10^7$ bits per second, so that the time occupied by all the data is $10^{-2}$ seconds. The scan time will be a few times larger than this, since data from each node must be transmitted to another node, error-checked and re-transmitted. In the improvement described below, this scan time is minimized to speed up data acquisition by the master node 14.

High Speed Polling Protocol of the Co-Pending Application:

In the co-pending application, this scan time is significantly reduced from that of the network described in the parent application by employing a polling message which is not addressed to any particular node (for example, by designating a "generic address" or no address at all), so that each node responds to the polling message as it is received. Alternatively, this effect is accomplished by simply programming the microprocessor in each remote node 16 to respond to any received message identifying itself as a polling message as if the polling message had been specifically addressed to that node. In any case, to poll all of its remote nodes, the master node 14 transmits a single "generic" polling message once on all of the links 18 connected to it. This polling message is first received at each of the remote nodes 16 which are connected directly to the master node 14 (as distinguished from those remote nodes connected indirectly —through other remote nodes—to the master node 14). After a delay time required for the nodes to relay the polling message, the next set of remote nodes, namely those of the remote nodes 16 which are one node removed from the master node 14, receive the polling message. Again, after an equal delay time, the following set of nodes, namely those of the remote nodes 16 which are two nodes removed from the master node 14, receive the polling message, and so forth, until after a number of such delay times all remote nodes 16 have received the polling message.

Figure 2B:
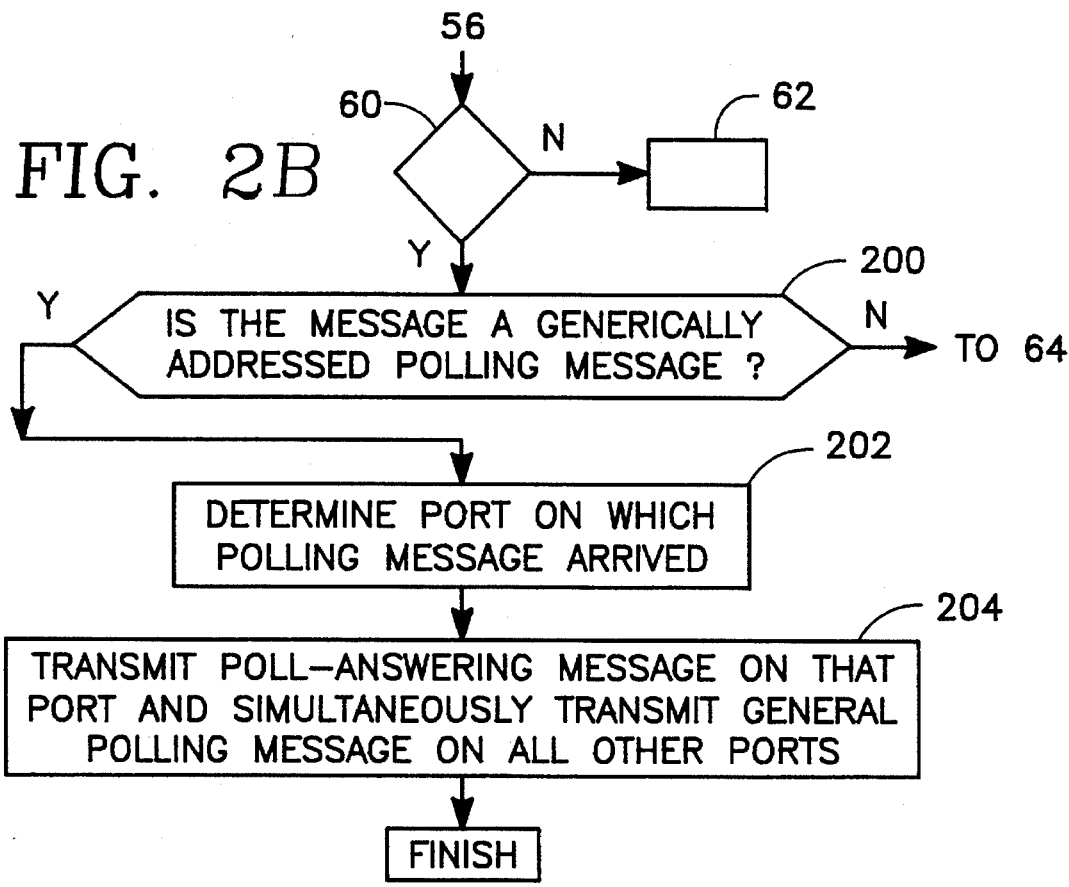
FIG. 2b is a flow diagram of a distributed protocol process and high speed polling process of the co-pending application.

Referring to FIG. 2b, the manner in which the microprocessor of each remote node 16 is programmed to respond to the "generic' polling message follows the process of FIG. 2a, except that after the YES branch of block 60, the following is performed: The remote node 16 senses whether the message is a generically addressed polling message (block 200 of FIG. 2b). Such a generically addressed polling message was treated in the previous step of block 60 as designating that node as its destination, since such a polling message designates all remote nodes 16 as its destination. In order to distinguish generically addressed polling messages from all other types of messages, all master nodes 14 are programmed to append an identifier to their generically addressed polling messages and each remote node is programmed to recognize that identifier. If the message is not a generically addressed polling message (NO branch of block 200), the process carries on with the step of block 64 as in FIG. 2a. Otherwise (YES branch of block 200 of FIG. 2b), it determines which one of its incoming ports (optical fiber cables) received the polling message (block 202 of FIG. 2b). The remote node 16 constructs an answering message responsive to the polling message (or else retrieves an answering message it has already constructed from memory) and transmits the answering message back down the same port (optical fiber cable) toward the direction from which the polling message was received (block 204 of FIG. 2b). Simultaneously (in order to save time), the remote node 16 broadcasts the received polling message on all of its other ports (block 204 of FIG. 2b). Generally, however, when receiving messages from other remote nodes and relaying them onward, a remote node 16 broadcasts such messages on all of its ports (optical fibers). This includes poll-answering messages from other remote nodes whose ultimate destination is the master node 14.

Figure 2C:
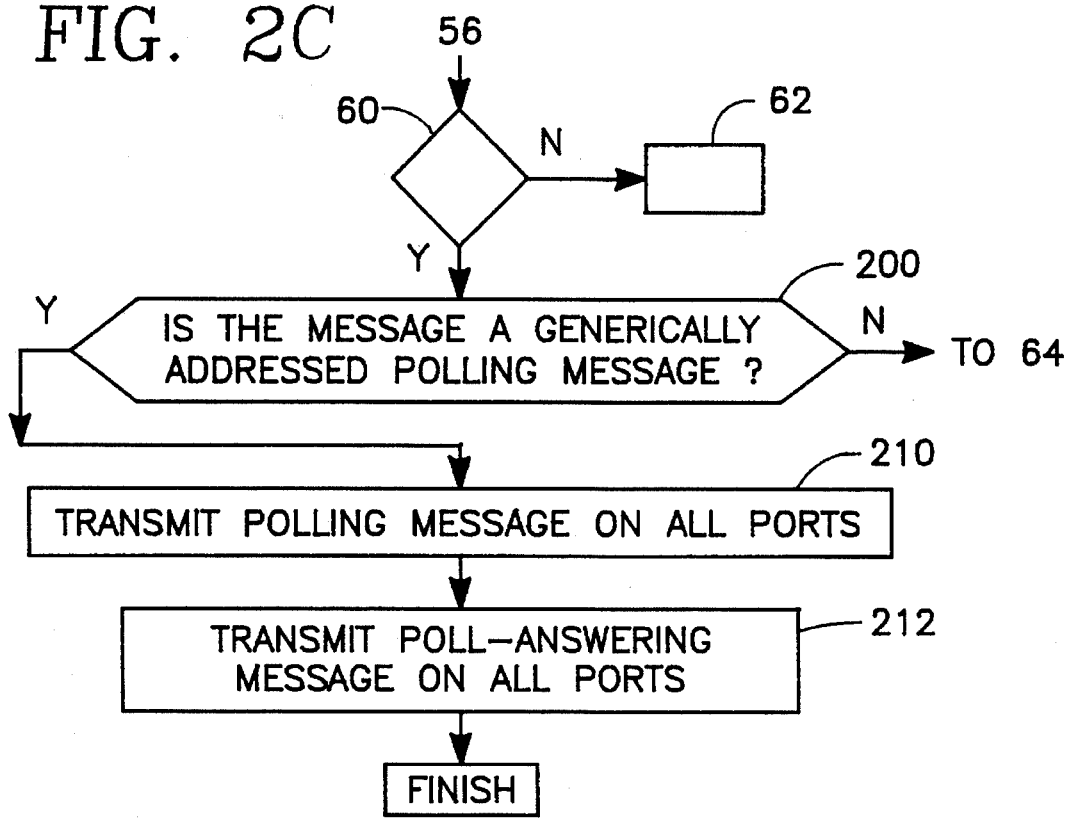
FIG. 2c is a flow diagram of a distributed protocol process and high speed polling process of the present invention.

High Speed Polling Protocol of the Present Invention:

In the invention of the present application (corresponding to the third row, which is labelled "PRESENT INVENTION"), each remote node 16 broadcasts on all of its ports (optical fibers) the generic polling message as received and all poll-answering messages, including those it generates itself as well as those received from other remote nodes, so that the "generic" polling message and each poll-answering message from each remote node 16 flood the network. In this embodiment, the transmitting of the polling message and of the poll answering message generated within the particular remote node 16 is not simultaneous as in the first embodiment, but rather is sequential. Referring to FIG. 2c, upon receiving a generically addressed polling message (YES branch of block 200), each remote node 16 first broadcasts its poll-answering message on all of its ports (block 210) and then, after an appropriate delay, broadcasts the polling message previously received on all of its ports (block 212).

Hierarchy of Nodes:

In order to permit more frequent polling of critical nodes and less frequent polling of less important nodes, the individual remote nodes may be programmed to respond only to a special class of polling messages. The class of a polling message may be determined by the node from certain contents or labels of the polling message. Alternatively, the individual remote nodes may be programmed to respond only to every $n^{th}$ polling message received, wherein n is an integer inversely proportional to the importance of the particular remote node 16 relative to all other remote nodes in the network, or they may be programmed to respond only to a special class of polling messages. The number n is any integer and may even assume the value of infinity, in which case the node is programmed to never respond to a polling message. For the most important nodes, n=1. This feature may be implemented in any of the first, second or third embodiments described above.

The process of generating a message by either a master node 14 or a node 16 which has received a message requesting transmission is as follows:

1) create information portion of message;

2) append a unique identification number to the message;

3) append the identification of the originating node and the destination node (which is all nodes within the master node's zone, in the case of a generically addressed polling message); and 4) transmit the message.

Transferring Control to the Master node of Another Zone:

Another feature described in the above-referenced parent application permits compensation for the loss of one of the master nodes 14 in the network. Specifically, another master node (or a unit higher in the control hierarchy) detecting the loss can remotely re-program one or more of the nodes 16 to no longer isolate the zone of the network served by the lost master node 14. This enables a master node serving an adjacent zone of the network to take over the monitoring and control of all the nodes in the zone of the lost master node. In accordance with this feature, each of the nodes 16 may be programmed or re-programmed by a message directed to it from any master node 14. For example, each node 16 is programmed to re-transmit a received message destined for another node or to respond to a received message destined for the node itself, provided that the message identifies its source as the master node 14 of the local zone of the node. If failure of the local master node is detected, the master node 14 of an adjacent zone can send a message to each of the nodes in the zone of the failed master node instructing them to begin responding to messages whose source is the adjacent zone's master node.

Structure of a Typical Node:

The preferred structure of each one of the nodes 16 is illustrated in FIG. 3. The same structure may also be used to implement each of the master nodes 14 as well as each of the gateway nodes 20. As mentioned previously herein with reference to FIG. 1b, each of the links 18 is preferably an optical fiber link. Each link 18 accommodates two-way traffic and for reasons of economy comprises two optical fibers. The apparatus of FIG. 3 can function as either an ordinary node 16 which is connected to two other nodes 16 via optical links, as an intersection node 16 connected to more than two other nodes via more than two optical links or as a gateway node 20 which is capable of responding to more than one master node 14 and which (in the embodiment of FIG. 1b) is connected to four other nodes 16 via four optical links. Also, if the apparatus is used in a master node 14, it may be connected to any number of other nodes 16. However, FIG. 3 only shows connections to two bi-directional optical links 18a, 18b comprising outgoing fiber optic cables 18a-1 and 18b-1 and incoming fiber optic cables 18a-2 and 18b-2, respectively, additional links being includable. A set of optical bypass switches 66, 68 enable an incoming message to be relayed directly to the next node. When a node 16 or 20 is in service (i.e., is not bypassed) it acts as a repeater for incoming signals. The advantage of such frequent repetition and boosting of the optical signals throughout the network is that even slight optical dispersion effects that might appear because of the use of low-grade optical fiber will not accumulate in the system.

Preferably, the switches 66 and 68 perform a "deadman switch" function whenever the node or its power supply is not functioning, in which any incoming message from one of the optical links 18a or 18b is passed directly to the other one via the optical fibers labelled "optical bypass" in FIG. 3. The advantage of this feature is that the failure of a node cannot interrupt the relaying of messages throughout the network.

As shown in FIG. 3, a microprocessor 80 receives signals from and transmits signals to the optical links 18a, 18b. Any received signals from the incoming optical cables 18a-2 and 18b-2 are converted from optical to electrical signals by respective optical-to-electrical converters 72, 74. Any signals generated by the microprocessor 80 for transmission on either of the outgoing fiber optic cables 18a-1, 18b-1 are converted from electrical to optical signals by respective electrical-to-optical converters 76, 78. Since the microprocessor 80 typically transmits and receives bytes of plural data bits in parallel and since the links 18 typically carry the data in bit serial form, serial/parallel data conversion between the microprocessor 80 and the "left-to-right" link comprising the fiber optic cables 18b-2 and 18a-1 is performed by a serial/parallel converter 84. Likewise, serial/parallel data conversion between the microprocessor 80 and the "right-to-left" link comprising the fiber optic cables 18a-2 and 18b-1 is performed by a serial/parallel converter 82. A node memory 86 is typically part of the memory in microprocessor 80. The node memory 86 stores the message identification number stack which is required in the distributed protocol process of FIG. 2a.

Data acquisition and control processing functions 88 can be performed by the microprocessor 80. The microprocessor 80 permits the acquisition and control functions 88 to interface with the network of FIG. 1b. The structure of the software and hardware embodied in the acquisition and control functions 88 is largely independent of the operation of the network of FIG. 1b. For reasons of efficiency, hardware attached to the microprocessor 80 performs channel encoding and decoding of data to be transmitted on or received from the optical links 18a, 18b. Preferably, it is anticipated that the links 18 will employ a differential Manchester code. Therefore, the microprocessor 80 performs or manages other hardware not shown in FIG. 4 which performs differential Manchester encoding and decoding. The microprocessor 80 also performs other tasks necessary to interface with the network. For example, the microprocessor 80 performs the distributed protocol control process referred to above in connection with to FIG. 2a.

One advantage is that the data acquisition and control functions 88 may be modified to add new power monitoring or control functions, for example, without requiring any changes in the network of FIG. 1b. It may be necessary to provide additional instructions in the microprocessor 80 to enable it to communicate with the additional functions. As a result, the network of FIG. 1b may be continually improved by the addition and refinement of power monitoring and control functions at any or all nodes in the network during the lifetime of the network. More importantly, new power monitoring and control software and hardware for insertion in the acquisition and control apparatus 88 can be developed any time during the life of the network independently and competitively for purchase and installation by the electric utility company owning the network, provided the independent developers are apprised of such details as the architecture of the microprocessor 80.

Some examples of peripheral monitoring and control functions for the acquisition and control apparatus 88 are illustrated in FIG. 3. For automatic electric power distribution control, each node may have high voltage apparatus at an adjacent point in a power line coextensive with the optical links 18a, 18b. The high voltage apparatus is controlled by a peripheral controller 94 which receives command signals generated by the data acquisition and control apparatus 88 through a signal conversion device 96. The conversion device 96 may, for example, be a digital-to-analog converter. An isolator 98 provides high voltage isolation between the controller 94 and the converter 96.

Electric power monitoring may be performed by an electrical sensor 100, for example, sensing current in the power line. The output of the sensor 100 is converted by a conversion device 102 to a digital format for processing by the acquisition and control device 88. If an opto-electronic sensor 104 is employed, its output is converted from an optical signal to an electrical signal by a converter 106 (which also provides high voltage isolation). The converted electric signal is converted to a digital format by a conversion device 108 for processing by the acquisition and control apparatus 88.

In modifying the acquisition and control apparatus, additional processors may be installed as additional elements of the apparatus 88 with new software governing their operation to implement the added functions. Thus, the acquisition and control apparatus 88 may include a number of microprocessors and memories, for example.

Figures 4, 5:
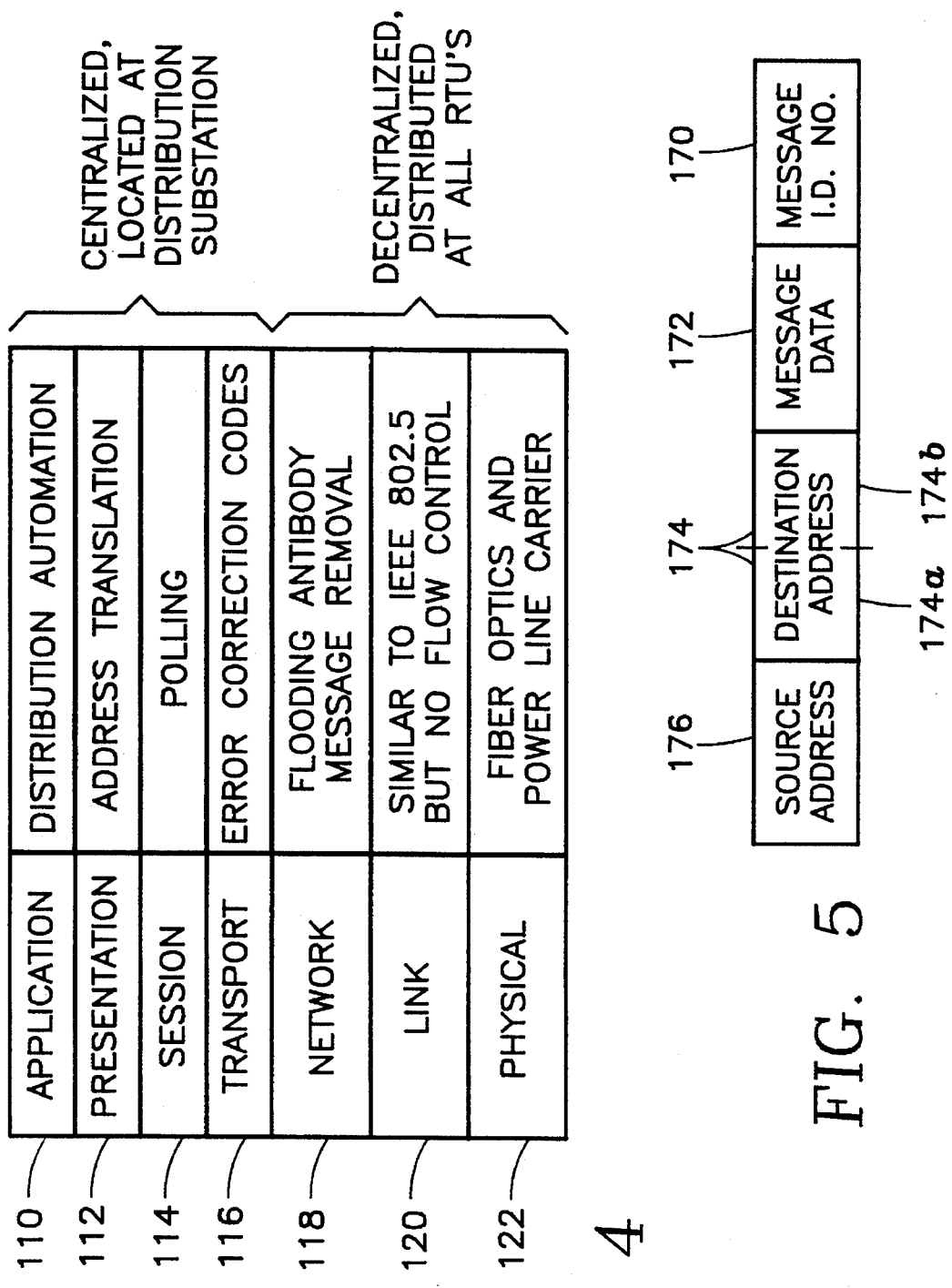
FIG. 4 illustrates an architecture for implementing the process of FIGS. 2a–2c in the network of FIGS. 1a–1b
FIG. 5 illustrates a preferred block format for messages employed in the embodiment of FIGS. 1a–1b

Programming Architecture:

The architecture of the node of FIG. 3 is illustrated in FIG. 4. The functions of the node, which may be implemented with the microprocessing devices 80 and 88 with pre-programmed micro-instructions or software, comprise seven layers: an application layer 110, a presentation layer 112, a session layer 114, a transport layer 116, a network layer 118, a link layer 120 and a physical layer 122. Preferably, each of the layers except the physical layer 122 is implemented as software or a set of program instructions stored in the memories of appropriate node processors. The order of these layers is consistent with the well-known Open System Interconnection (OSI) model of the International Standards Organization (ISO) (published in Zimmerman, H., (1980) "OSI Reference Model—the ISO Model of Architecture for Open Systems Interconnection", *IEEE Transactions on Communications*, Vol. COM-28, No. 4, April, pp. 425–432).

In the invention, the applications layer 110 consists of the control and monitoring functions of power distribution system operation, or can be other functions in other applications of the present invention. As described previously herein, the polling function performed by the master nodes 14 permits all communication control in the network of FIG. 1b to be concentrated in the master nodes 14. Therefore, the applications layer 110 is likewise concentrated in the master nodes 14. In the preferred embodiment, the applications layer is implemented as a set of program instructions stored in the memory of the processor of each master node 14. If the network of FIG. 1b is associated with an electrical power distribution network, then the applications program instructions carry out processes for the master node 14 to instruct appropriate ones of the nodes 16 in its zone to monitor and report certain power conditions at remote locations and to perform certain power control functions. In this embodiment, the remote nodes 16 would store only a few of the applications layer program instructions in order to execute appropriate commands from their master node 14. The presentation layer 112 converts data descriptions used by applications software in the application layer 110 into data addresses recognized by lower layers in the architecture of FIG. 4. The presentation layer is implemented in the microprocessor 80. The session layer 114 performs the polling function described above facilitated by the steps of blocks 60, 62 and 64 in FIG. 3a and is also implemented in the microprocessor 80. The transport layer 116, in one embodiment, may perform error detection and correction and is likewise implemented in the microprocessor 80. The network layer 118 is implemented in the microprocessor 80 and performs the distributed protocol control process of the steps of blocks 48, 50, 52 and 54 in FIG. 2a. This process floods the network of FIG. 1b with many copies of the same message by virtue of the message replication operation performed by the nodes 16 or 20, as described hereinabove. The data link layer 120 frames the data into blocks, in accordance with well-known techniques (such as ANSI/IEEE Standard 802.3) and is implemented in hardware attached to the microprocessor 80. However, unlike the prior art, this layer issues no re-transmission requests in the event of an error. There seems little to be gained by retaining the conventional technique of message receipt acknowledgement. Since fiber optic links generally have a bit error rate of $10^{-9}$ or better, the probability of sending an error-free message of 1000 bits in the network of FIG. 1b is $(1-10^{-9})^{1000}$, which is a success probability of 99.99990%. It therefore seems inherently wasteful to devote any amount of effort to acknowledging successful reception of data.

Figure 6:
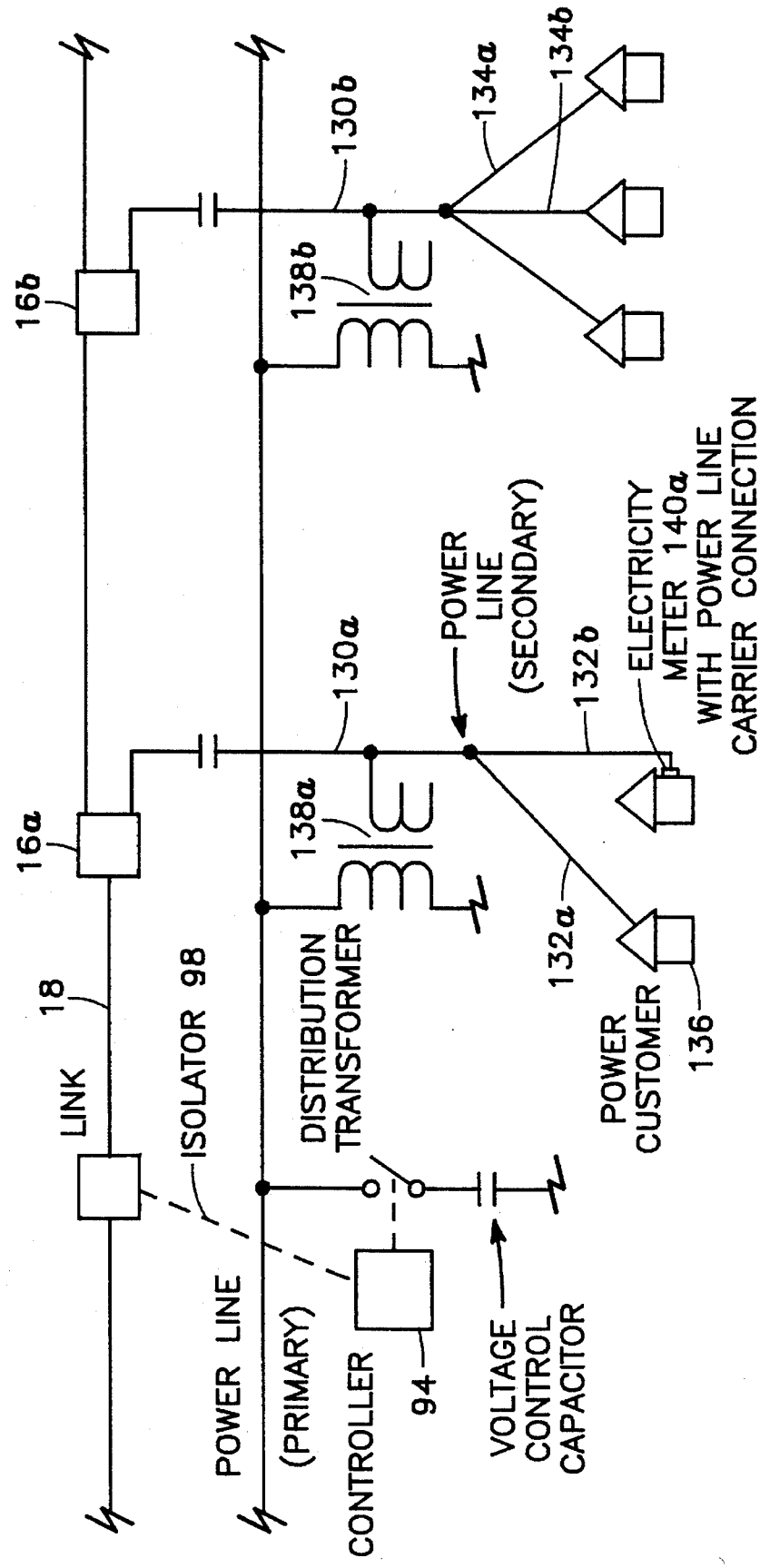
FIG. 6 is a diagram of a portion of a power distribution network including a primary circuit and a secondary circuit

The physical layer 122 includes the fiber optic links 18 of FIG. 1b and also includes non-fiber optic low speed links. Therefore, in one embodiment of the invention, the physical layer is a hybrid, as illustrated in FIG. 6. The primary or fiber optic network consists of the fiber optic links 18 and the remote nodes 16 of FIG. 6, corresponding to the network of FIG. 1b. The secondary or non-fiber optic network consists of the power line carrier input/outputs 130a and 130b of the primary nodes 16a, 16b, and the secondary power lines 132a, 134a, 132b, 134b connecting each power customer 136 with a respective stepdown transformer 138a, 138b. Sensors 140 at the customers 136 report their findings via power line carrier to the appropriate node 16a, 16b. If the node 16a obtains a reading from a secondary monitor 140a, for example, it reports this reading to its local master node 14 (not shown in FIG. 6).

The advantage of the hybrid nature of the physical layer 22 is that it enables the continued use of existing load-control and meter-reading hardware, which in turn implies minimum need to enter the customer's premises for installation. Further, communication into the home can be compatible with other communication applications of home wiring (for example the PLBus of the Electronic Industries Association (EIA) Home Automation Standard). An EIA PLBus interface at each distribution transformer would allow the utility company to accomplish far more control than simple management of one load. Not only could there be the capability of emergency load-shedding, but a solution to cold load pickup problems would be available. Other features, such as re-setting clocks in subscribers' homes after power failures, may also be developed.

In cost terms, a hybrid of this kind is certain to be competitive if more than one function is to be performed by the distribution automation system. Feeder automation functions can be implemented competitively and demand side management can be added at extremely low cost. The small size of the network to be covered by the DLC or home wiring system on the non-fiber optic links (typically 3 or 4 homes) greatly eases its communications requirements. Very low power, inexpensive modules operating at about 120 kHz are widely available, and signalling speeds up to 1200 baud are possible. The incremental cost of adding this capability and other functions at the customer level would be minimized.

For reasons of cost, the fiber optic links 18 are preferably multimode fibers with near-infrared LED transmitters operating at a bit rate of between 10 and 15 MHz. The non-fiber optic links in the secondary circuits employ low-power power line carrier transmissions, as discussed above.

Message Format:

FIG. 5 illustrates one exemplary format for the messages communicated in the network of FIG. 1b. Each message is a serial packet of bits of which the first block 170 specifies the message's unique identification number, the second block 172 contains the message data, the third block 174 specifies the destination address and the fourth block 176 specifies the source address of the message (i.e., a particular node 16 or 20 or master node 14).

In the present invention, in order to accomodate the generic addressing of polling messages to all nodes within a particular zone, for example, the block 174 containing the destination address data consists of two address blocks, namely an upper address block 174a and a lower address block 174b specifying the upper and lower bounds of the address range of the zone all of nodes to which the polling message is addressed. All remote nodes 16 within a particular zone are addressed in a numerical order so that all of their addresses are specified by simply specifying the high and low addresses bounding their range of addresses. For this purpose, each node processor 80 is programmed to respond if its local address falls within the range of addresses between the upper and lower addresses contained in the destination address block 174. For other types of messages which are to be addressed to a single node only, the upper and lower addresses in the block 174 would be the same address. In one embodiment, the presence of different address values in the two address blocks 174a and 174b functions as a flag to the remote node which distinguishes the message as a generically addressed polling message. Any message so distinguished is treated in accordance with the process such as that described above with reference to FIG. 2b. The foregoing is readily implemented using well-known techniques in the art.

While the network of FIG. 1b has been described above as being co-extensive with an electrical power distribution system including plural power substations in which each master node 14 is located, the invention may also be employed in a manner in which the network of FIG. 1b is co-extensive with the internal nodes within a power substation, so that each individual node 14, 16 or 20 corresponds with an individual location within the power substation.

While the invention has been described in detail by specific reference to preferred embodiments thereof, it is understood that variations and modifications thereof may be made without departing from the true spirit and scope of the invention.

What is claimed is:

1. A communication network comprising:

a plurality of remote nodes, each of said remote nodes comprising processor means for repeating received messages addressed to others of said nodes;

a plurality of links for connecting said plurality of remote nodes;

a master node, said master node being connected by said links to at least one of said remote nodes and comprising means for transmitting a polling message addressed to at least some of said remote nodes; and wherein each of said remote nodes comprise poll-responsive means responsive to receipt of said polling message for transmitting a poll-answering message and for re-transmitting said polling message to others of said remote nodes, wherein:

each remote node is connected to plural ones of said links; and said poll-responsive means comprises means for sequentially (a) transmitting said poll-answering message on all links to which said remote node is connected and (b) re-transmitting said polling message on all links to which said remote node is connected, whereby said poll-answering message and said polling message flood said network sequentially.

2. The communication network of claim 1 wherein each one of said remote nodes further comprises means for re-transmitting a poll-answering message received from another node on all links to which said one node is connected.

3. The communication network of claim 1 wherein each of said node processor means further comprises message terminating means for terminating a polling message which has been received at the corresponding node more than once.

4. The communication network of claim 3 wherein said node processor means comprises:

means for originating a poll-answering message comprising an information portion;

means for attaching a unique identification number to said poll-answering message for transmission with said poll-answering message;

memory means for storing said unique identification number attached by said attaching means and an identification number of a received poll-answering message; and wherein said message terminating means further comprises means for comparing the identification number of each received poll-answering message with the identification numbers stored in the memory means and terminating any poll-answering message having an identification number stored in said memory means.

5. The communication network of claim 1 wherein:

said communication network is divisible into a plurality of groups of said remote and master nodes, each of said groups including its own master node connected to at least one of the remote nodes within the corresponding group, and the node processor means of each remote node is programmed to re-transmit only those message identifiable as being from the master node of the corresponding group.

6. The communication network of claims 5 wherein each master node further comprises:

means for broadcasting a message instructing the remote nodes in a group different from the group of said master node to re-transmit messages originated in the group of said master node.

7. The communication network of claim 5 further comprising gateway nodes connected to remote nodes in adjacent ones of said groups.

8. The communication network of claim 7 wherein said gateway nodes comprise gateway node processor means for repeating or responding to received messages originated in different groups.

9. The communication network of claim 1 wherein said communication network is co-extensive with an electrical power distribution network.

10. The communication network of claim 9 wherein said node processor means comprises at least one of:

sensing means for monitoring said electrical power distribution network near the node, and regulation means for controlling said power distribution network near said node.

11. The communication network of claim 10 further comprising a set of secondary nodes connected to respective ones of said remote nodes by secondary links, wherein said links connecting said remote nodes comprise fiber optic cables and said secondary links comprise relatively low bandwidth non-fiber optic links.

12. The communication network of claim 11 wherein said power distribution network comprises a high-voltage primary circuit and a plurality of low-voltage secondary circuits receiving power through step-down transformers from said primary circuit, wherein said secondary nodes are co-located with respective ones of said secondary circuits, said secondary links comprising power line carriers for coupling between said secondary circuits with said co-located secondary nodes and said remote nodes.

13. The communication network of claim 1 further comprising bypass means in each node for permitting received messages to bypass the node.

14. The communication network of claim 1 wherein said poll-responsive means comprises means for responding only to a particular class of polling messages.

15. The communication network of claim 14 wherein said particular class is specified by contents of a predetermined portion of a polling message.

16. The communication network of claim 1 wherein said poll-responsive means comprises means for responding to every $n^{th}$ polling message, wherein n is an integer stored in an individual node, whereby different nodes respond to polling messages at different rates.

* * * * *